United States Patent [19]
Ryu

[11] Patent Number: 5,884,727
[45] Date of Patent: Mar. 23, 1999

[54] HERMETIC COMPRESSOR WITH START-UP LUBRICATION

[75] Inventor: Kio Ryu, Cheonan, Rep. of Korea

[73] Assignee: Samsung Electronics Co., Ltd., Suwon, Rep. of Korea

[21] Appl. No.: 883,005

[22] Filed: Jun. 26, 1997

[30]     Foreign Application Priority Data

Jul. 1, 1996   [KR]   Rep. of Korea .................. 1996-26601

[51] Int. Cl.[6] ..................................... F01M 9/00
[52] U.S. Cl. .............................. 184/6.3; 184/6.18; 92/153
[58] Field of Search .................................. 184/6.18, 6.3; 92/154, 153; 418/88

[56]           References Cited

U.S. PATENT DOCUMENTS

| | | | |
|---|---|---|---|
| 3,049,285 | 8/1962 | Doeg ....................................... | 184/6.18 |
| 3,674,382 | 7/1972 | Kubota et al. ......................... | 184/6.18 |
| 3,767,013 | 10/1973 | Caldwell ................................. | 184/6.3 |
| 3,848,702 | 11/1974 | Bergman ................................. | 187/6.3 |

*Primary Examiner*—Thomas E. Denion
*Attorney, Agent, or Firm*—Burns, Doane, Swecker & Mathis, L.L.P.

[57]         ABSTRACT

A hermetic compressor is provided. The compressor comprises: a hermetic casing; a driving motor having a stator, a rotor and a rotating shaft rotating with the rotor and having a journal formed thereon; a compressing portion driven by the driving motor for compressing a compressible medium; and a bearing for rotatably supporting the journal of the rotating shaft, wherein an oil remaining recess for containing a lubricating oil is formed on the journal when the compressor stops its operation and for supplying the oil between the journal and the bearing when the compressor starts its operation. Accordingly, the oil can be suitably supplied between the journal and the bearing when the compressor restarts, thereby preventing non-lubricating friction between the journal and the bearing.

7 Claims, 6 Drawing Sheets

FIG. 4
FIG. 5
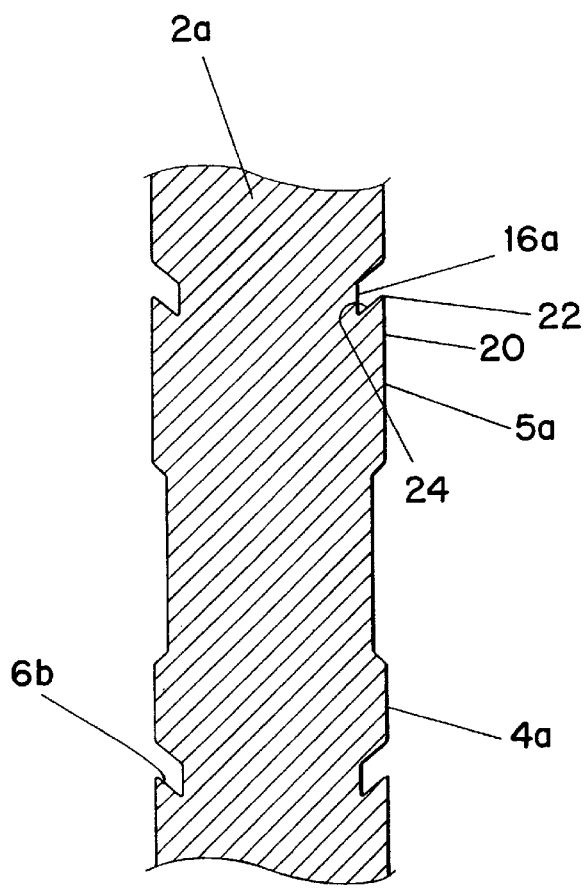
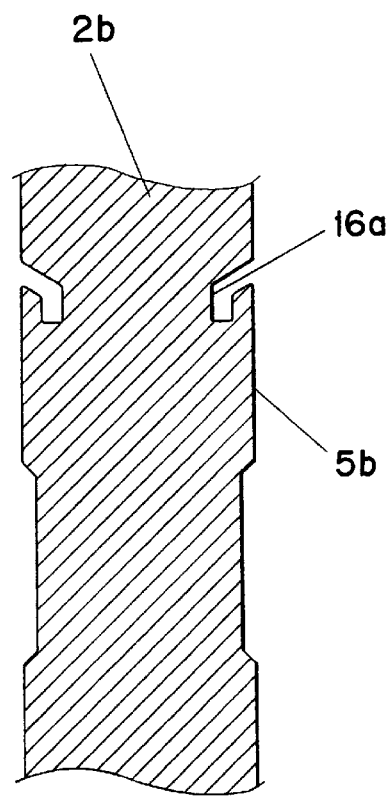

5,884,727

HERMETIC COMPRESSOR WITH START-UP LUBRICATION

BACKGROUND OF THE INVENTION

The present invention relates to a hermetic compressor which is improved such that a lubricating oil remains on the surface of a journal of a rotating shaft of the compressor when the compressor stops its operation.

A hermetic compressor is generally employed in a cooling system such as a refrigerator or an air conditioner, so as to compress a gaseous refrigerant from an evaporator to a high-temperature and high-pressure state and supply the compressed refrigerant to a condenser. The hermetic compressor generally includes a hermetic casing, a driving motor installed inside the casing and a compressing portion driven by the driving motor to compress the refrigerant. The compressing portion is classified into a reciprocating type and a rotary type according to its compression mechanism.

FIG. 7 shows a sectional view of a conventional hermetic reciprocating compressor. As shown in the drawing, the conventional compressor includes a casing 100 forming a closed internal space, a driving motor 101 installed inside the casing 100 and a compressing portion 130 which is driven by the driving motor 101.

The driving motor 101 includes a stator 102, a rotor 104 rotatably installed inside the stator 102 and a rotating shaft 106 fitted into the rotor 104 and rotating therewith.

The compressing portion 130 includes a cylinder 131, a piston 132 reciprocating inside the cylinder 131 and a cylinder head 133. The piston 132 is connected to an eccentric portion 112 of the rotating shaft 106 by a connecting rod 134 and reciprocates inside the cylinder 131 according to a rotational movement of the rotor 104, thereby inhaling and compressing the refrigerant.

A journal 109 is formed at the lower portion of the rotating shaft 106 and rotatably supported by a bearing 108. The journal 109 slides frictionally against the bearing 108. A lubricating oil 118 is contained in the bottom portion of the casing 100 and picked up by an oil pickup tube 116 which is extended downwardly from the eccentric portion 112 of the rotating shaft 106 to be supplied between the journal 109 and the bearing 108. The oil picked up by the oil pickup tube 116 flows upward along an oil groove 110 formed on the outer surface of the journal 109 and is supplied to the surface of the journal 109, so as to perform a lubricating action between the journal 109 and the bearing 108.

However, when the driving motor 101 stops in the conventional hermetic compressor, most of the oil which is located between the journal 109 and the bearing 108 flows downward by its own weight, so that little oil remains therebetween. Therefore, when the compressor restarts its operation, non-lubricating friction generates between the journal 109 and the bearing 108 until the oil is supplied therebetween through the oil pickup tube 116, thereby increasing abrasion of the journal 109 and the bearing 108, making a starting rotation of the rotating shaft 106 unstable and generating noises.

SUMMARY OF THE INVENTION

It is an object of the present invention to provide a hermetic compressor which is capable of easily supplying a lubricating oil to a journal of a rotating shaft at the time when the compressor starts up. To accomplish the above object, there is provided a hermetic compressor comprising:

a hermetic casing;

a driving motor having a stator, a rotor and a rotating shaft rotating with the rotor and having a journal formed thereon;

a compressing portion driven by the driving motor for compressing a compressible medium; and a bearing for rotatably supporting the journal of the rotating shaft, wherein an oil remaining recess is formed on the journal to contain a lubricating oil when the compressor stops its operation and supply the oil between the journal and the bearing when the compressor starts its operation.

It is preferable that the journal has an upper journal portion and a lower journal portion which are separated by an oil bank formed therebetween on the rotating shaft and having a smaller diameter than those of the upper and lower journal portions, and the oil remaining recess is formed on the upper journal portion. The oil remaining recess may be formed on each of the upper and lower journal portions. It is also preferable that the oil remaining recess is inclined downwardly from the surface of the journal. Alternatively, the oil remaining recess may have a bent structure.

BRIEF DESCRIPTION OF THE DRAWINGS

The above object and advantages of the present invention will become apparent by describing in detail preferred embodiments thereof with reference to the accompanying drawings in which:

FIGS. 4 through 6 show sections showing modified examples of oil remaining recesses formed on the rotating shaft according to the present invention.

DETAILED DESCRIPTION OF THE INVENTION

Figure 1:
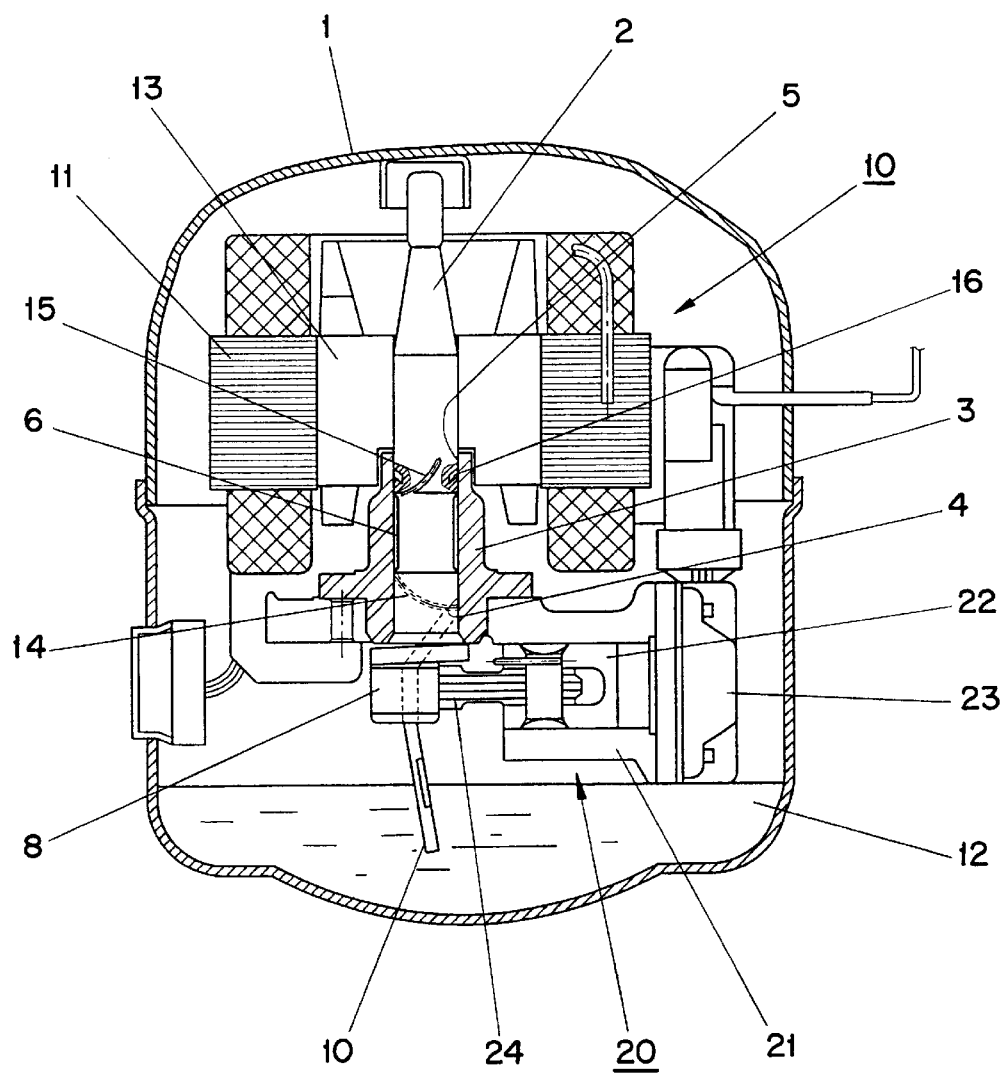
FIG. 1 shows a section of a hermetic compressor according to the present invention.

Referring to FIG. 1, a hermetic compressor according to the present invention includes a casing 1 forming a closed internal space, a driving motor 10 installed inside the casing 1 and a reciprocating compressing portion 20.

The driving motor 10 includes a stator 11, a rotor 13 rotatably installed inside the stator 11 and a rotating shaft 2 fitted into the rotor 13 and rotating therewith. An eccentric portion 8 is connected to the lower end of the rotating shaft 2. An oil pickup tube 10 is extended downward from the eccentric portion 8 and is submerged into a lubricating oil 12 contained in the bottom portion of the casing 1. The rotating shaft 2 is rotatably supported by a bearing 3.

The compressing portion 20 includes a cylinder 21, a piston 22 reciprocating inside the cylinder 21 and a cylinder head 23. The piston 22 is coupled with the eccentric portion 8 of the rotating shaft 2 through a connecting rod 24 and reciprocates inside the cylinder 21 by the driving motor 10 to inhale a compressible medium such as a refrigerant and compress the medium.

Figure 2:
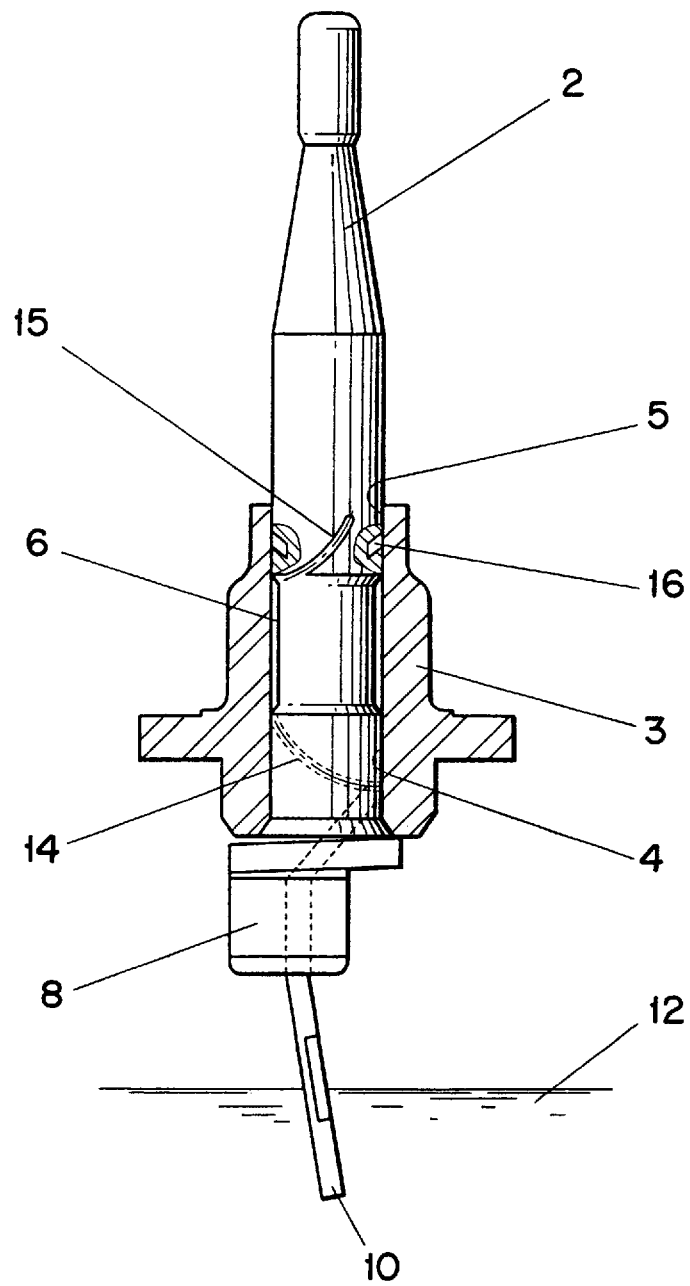
FIG. 2 shows an enlarged view of a rotating shaft and a bearing for use in the compressor in FIG. 1.
Figure 3:
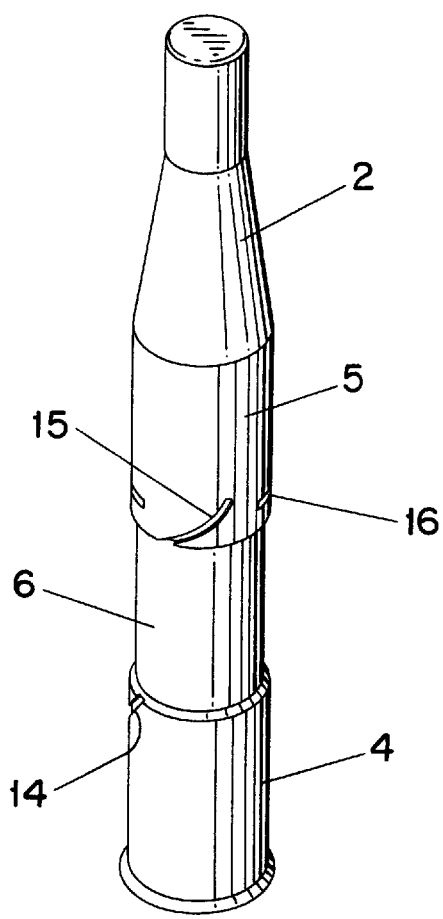
FIG. 3 shows a perspective view of the rotating shaft in FIG. 2.

Referring to FIGS. 1 to 3, an upper journal 5 and a lower journal 4 are formed on the middle and lower portions of the rotating shaft 2, respectively. The upper and lower journals 5 and 4 slide frictionally against the bearing 3. Oil grooves 15 and 14 for guiding the oil flowing upward by the oil pickup tube 10 are formed on the upper and lower journals 5 and 4, respectively. An oil bank 6 having a smaller diameter than those of the upper and lower journals 5 and 4 is provided between the upper and lower journals 5 and 4, so as to temporarily store the oil flowing upward along the oil groove 14.

A pair of oil or retaining recesses 16 are formed on the upper journal 5 at opposite sides thereof in a radial direction from the outer surface of the upper journal 5. Each of the oil remaining recesses 16 is inclined downwardly and has a shape suitable for containing a small amount of the oil. As shown in FIG. 3, each oil remaining recess 16 preferably has a predetermined length along the circumference of the upper journal 5. The recess 16 prevents the oil retained therein from gravitating back to the oil resevoir.

According to the above-described structure, when the rotating shaft 2 stops its rotation by the stop of the compressor, most of the oil which is located between the upper and lower journals 5 and 4 and the bearing 3 flows downward by its own weight. At this time, part of the oil flows into the oil remaining recesses 16 and remains therein. When the compressor restarts, the oil contained in the oil remaining recesses 16 flows outward by the centrifugal force of the rotating shaft 2, to form a lubricating film between the upper and lower journals 5 and 4 and the bearing 3. Accordingly, suitable lubrication can be obtained between the upper and lower journals 5 and 4 and the bearing 3 until the oil is supplied by the oil pickup tube 10. According as the rotation of the rotating shaft 2 continues, the oil picked up by the oil pickup tube 10 is sufficiently supplied between the upper and lower journals 5 and 4 and the bearing 3 to thereby perform a stable lubrication.

Figure 6:
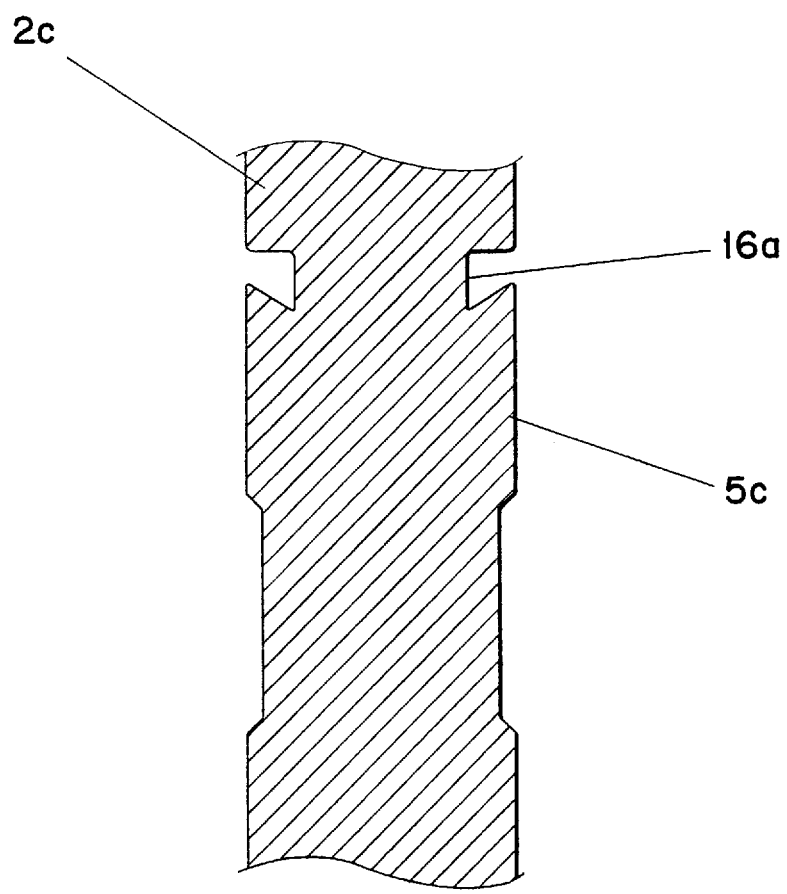
Figure 7:
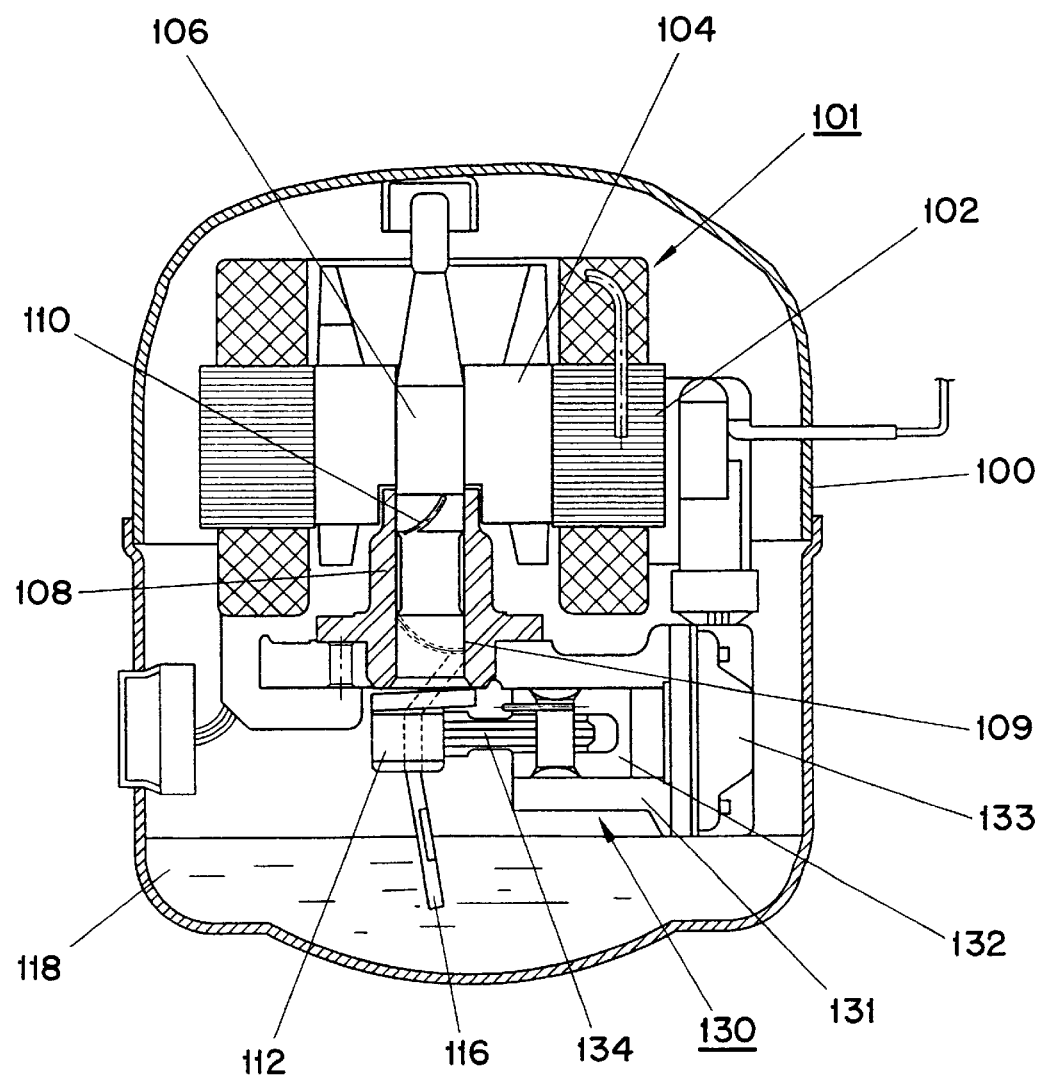
FIG. 7 shows a section of a conventional hermetic compressor.

FIGS. 4 to 6 two examples of the oil remaining recesses as viewed in vertical plane containing a center axis of the journal. Referring to FIG. 4, two pairs of oil remaining recesses 16a and 16b are formed on upper and lower journals 5a and 4a, respectively. Here, the respective oil remaining recesses 16a and 16b have the same shapes as in the above-described oil remaining recess 16.

The groove 16a intersects the outer peripheral surface 20 of the journal to form therewith a mouth 22, and is then inclined linearly downwardly therefrom to form a portion 24 of the recess located lower than the mouth. In the example in FIG. 5, a pair of oil remaining recesses 16c having shapes different from the oil remaining recess 16 are formed on an upper journal 5b. Each oil remaining recess 16c has a bent structure having an inclined portion and a vertical portion extended from the inner end of the inclined portion. Hence, the amount of the oil contained in the oil remaining recesses 16c can be increased compared with the oil remaining recesses 16. In FIG. 6, another oil remaining recesses 16d having approximate dovetail shapes are formed on an upper journal 5c. Here, the ceiling portion of the grooves 16c is formed horizontally and the bottom portion is formed inclinedly, so that machining of the oil remaining recesses 16c can be easily performed.

As described above, according to the hermetic compressor of the present invention, oil remaining recesses are formed on a journal of a rotating shaft to contain a lubricating oil when the compressor stops its operation and supply the oil between the journal and a bearing for rotatably supporting the journal when the compressor restarts its operation, thereby preventing non-lubricating friction between the journal and the bearing at the time of restart of the compressor.

What is claimed is:

1. A hermetic compressor comprising:

a hermetic casing;

a driving motor having a stator, a rotor and a rotating shaft rotating with said rotor and having a substantially vertical journal disposed thereon:

a compressing portion driven by said driving motor for compressing a compressible medium; and a bearing for rotatably supporting said journal of said rotating shaft, wherein an oil retaining recess is formed in an outer periphery of said journal to retain oil therein when the shaft stops rotating, the oil retaining recess configured to prevent the retained oil from gravitating to a lower end of said shaft so that the retained oil can be immediately supplied between said journal and said bearing when the compressor starts its operation.

2. A hermetic compressor as claimed in claim 1, wherein said journal has an upper journal portion and a lower journal portion which are separated by an oil bank formed therebetween on said rotating shaft and having a smaller diameter than those of said upper and lower journal portions, and said oil retaining recess is formed on said upper journal portion.

3. A hermetic compressor as claimed in claim 1, wherein said journal has an upper journal portion and a lower journal portion which are separated by an oil bank formed therebetween on said rotating shaft and having a smaller diameter than those of said upper and lower journal portions, and one of said oil retaining recesses is formed on each of said upper and lower journal portions.

4. A hermetic compressor as claimed in claim 1, wherein the hermetic casing forms an oil reservoir in a bottom section thereof, the journal further including oil grooves formed in the outer periphery of the journal, the oil grooves communicating with the oil reservoir for conducting an upward flow of oil in response to rotation of the journal, the oil grooves being spaced from the oil retaining recess.

5. A hermetic compressor as claimed in claim 1 wherein the oil retaining recess extends in a circumferential direction, a portion of said oil retaining recess disposed lower than a mouth of the recess formed in an outer peripheral surface of said journal, as viewed in a vertical plane containing a center axis of said journal.

6. A hermetic compressor according to claim 5 wherein said oil retaining recess is inclined linearly downwardly from said mouth to said portion.

7. A hermetic compressor according to claim 5 wherein said oil retaining groove includes a first section inclined downwardly from said mouth and a second section extending downwardly from a radially inner end of said first section, said second section defining said portion of said oil-retaining recess.

* * * * *